INVENTOR,
ALBERT J. GRANBERG.
BY
Lippincott & Metcalf
ATTORNEYS.

Patented May 28, 1946

2,401,067

UNITED STATES PATENT OFFICE 2,401,067

WATER SEPARATOR

Albert J. Granberg, Emeryville, Calif.

Application June 29, 1943, Serial No. 492,751

2 Claims. (Cl. 210—53)

My invention relates to gasoline supply and storage systems, and more particularly to a water separator for such systems.

Among the objects of my invention are to provide:

1. A novel and improved water separator for systems such as are employed in the distribution or storage of gasoline.

2. A novel and improved water separator wherein normally expected amounts of water will be drained away without interruption to normal operation of the distribution system in which such separator is employed.

3. A novel and improved water separator for systems such as used in the distribution or storage of gasoline wherein a water seal is maintained against the influx of air through the water drain exit or discharge.

4. A novel and improved water separator for systems such as used in the distribution or storage of gasoline, which water separator shall function to temporarily paralyze the system during existence of water in amounts above normal.

Additional objects of my invention will be brought out in the following description of a preferred embodiment of the same taken in conjunction with the accompanying drawing wherein—

Figure 1:
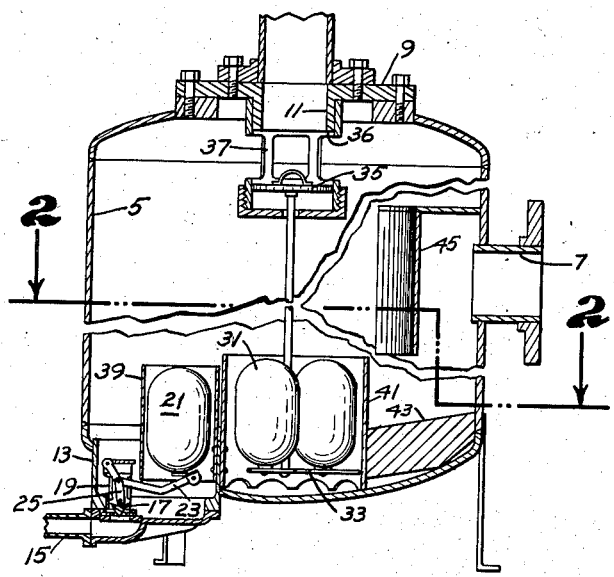
Figure 1 is a vertical sectional view through a separator of my invention.
Figure 2:
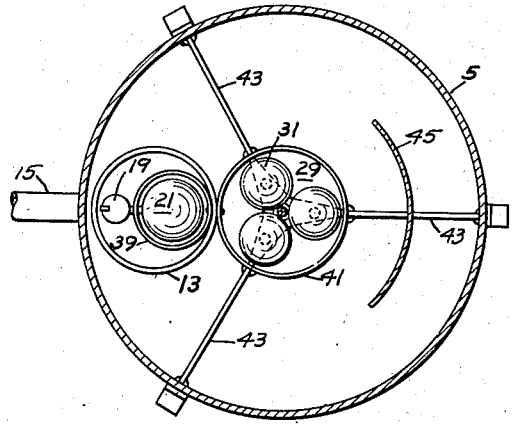
Figure 2 is a horizontal sectional view along the line 2—2 of Figure 1.

The aforementioned figures are substantially to scale.

My improved water separator may take the form of a metal chamber 5 adapted for connection in a hose or pipe line of a distribution system for the distribution of gasoline or the like, and for this purpose is provided with an inlet connection in a side wall thereof in the form of a flanged nipple 7 and an opening through the upper wall spanned by a top flange 9 having a discharge opening bounded by a depending cylindrical flange 11.

In the floor of the tank, preferably at a location diametrically opposite the inlet opening, a sump 13 is provided. An opening in the sump bottom leading to a discharge pipe 15 is normally closed by a valve 17 preferably of conical shape. This valve operates within a valve cage 19, its movement being controlled by a float 21 pivotally connected to the end of an operating lever 23 to which the conical valve is connected by a link 25. The specific gravity of the float 21 lies somewhere between that of water and that of gasoline, whereby the discharge valve 17 will remain closed until water accumulation in the sump rises to a level sufficient to lift the float to the point of opening the valve, whereupon to cause a discharge of water from the sump down the discharge pipe 15. The control exercised over the valve by the float 21 is such that the valve will close before all the water in the sump is discharged, thus assuring maintenance of a layer of water in the sump at all times to act as a seal against infiltration of air back up through the discharge line into the sump and thence into the gasoline flowing through the separator chamber.

Occasionally from one cause or another, the accumulation of water in the chamber is apt to occur at a rate in excess of that which the control valve 17 is capable of passing, and unless due safeguards are provided, a portion of this water will pass out through the discharge along with the gasoline, which, of course, is not to be desired. As a safeguard against this, I provide additional float means, the function of which is to close off the discharge opening under such conditions. Such additional float means includes a gang-float assembly 29 which comprises a plurality of floats 31 carried on a spider 33 which in turn is suspended from a disc valve 35 housed in a valve cage 37 depending from the cylindrical flange 11, which provides a valve seat 36 for the disc valve. Like the discharge control float 21 previously discussed, this float assembly is designed to rise in water and sink in gasoline.

Under normal conditions, that is when the gasoline is substantially free of water content, the first described float control 21 normally retains the water discharge control valve 17 in closed condition, whereas the float valve assembly 29 normally retains the disc valve 35 in open condition. The water discharge valve control 21 is designed to open its associated valve before the gang-float assembly 29 can reach a level sufficient to close off the gasoline discharge outlet. Therefore, when the water content of the gasoline is not excessive, the gasoline discharge outlet will remain open, while water accumulation will drain off through the discharge pipe 15 leading from the bottom of the sump 13.

However, when the rate of water intake is in excess of that capable of being handled by the water discharge valve 17, the water level will rise sufficiently to cause the gang-float assembly 29 to shut off the gasoline discharge outlet.

To assure efficient separation of the water from the gasoline and to realize proper functioning of the valves 17 and 35, certain precautions must be taken to prevent turbulence of the liquid as it flows into the water separator. To this end, I provide a float guard 39 about the float 21 and a float guard and guide 41 for the gang-float assembly. This latter is connected by radiating baffles 43 to the cylindrical wall of the chamber. The lower edges of the baffles and guard are scalloped or raised above the floor of the chamber to permit substantially uninterrupted flow or spread of the liquid throughout the chamber, without attendant swirling or the formation of eddies.

Directly in front of the inlet opening, I provide an arcuate baffle 45 against which the incoming liquid impinges and is caused to divide and be guided in a smooth stream to the bottom of the chamber, without striking any of the float mechanisms.

During the operation of the separator, should the discharge opening be closed off by the disc valve, positive and effective blocking action by this valve is assured by reason of the reduction of pressure on the discharge side of the valve, which would naturally cause the valve to remain tightly closed, even after the water in the chamber has had an opportunity to drain out through the valve 17. Accordingly, to assure resetting of the disc valve 35 to its normally open position, it is desirable to reestablish proper pressure balance as to this valve, which can be realized by shutting down the entire system and closing off the field outlets etc. while the liquid is draining through the valve 17.

While I have disclosed a preferred embodiment of my invention in detail, the same is subject to alteration without departing from the operating principles thereof. Therefore, I do not desire to be limited in my protection to the specific details set forth above, except as may be necessitated by the appended claims.

I claim:

1. A liquid separator comprising, a chamber having an intake opening for liquid to be separated, a discharge opening for the lighter component of such liquid, and a sump having a drain opening for the heavier component of such liquid, said sump including a wall rising above the floor of said chamber; a valve normally closing said drain opening; means responsive to the liquid level of said heavier component for operating said drain opening valve when said heavier component reaches a level above the bottom of said sump; valve means for said discharge opening including a cage encircling said discharge opening, a valve slidably disposed in said cage and having a valve stem depending therefrom and terminating in a spider, and a float assembly mounted on said spider, said independent valve means being adapted to close said discharge opening at a higher level of said heavier component than that at which the drain opening valve functions; a float guard closely surrounding said spider and constituting a guide for said float assembly; a plurality of vanes extending radially from said float guard to the wall of said chamber, both said float guard and said vanes having portions of their lower edges close to but spaced above floor level; and an arcuate baffle disposed across said intake opening in spaced relationship thereto.

2. A liquid separator comprising, a chamber having an intake opening for liquid to be separated, a discharge opening for the lighter component of such liquid, and a sump having a drain opening for the heavier component of such liquid; a valve normally closing said drain opening; means responsive to the liquid level of said heavier component for operating said drain opening valve when said heavier component reaches a predetermined level above the bottom of said sump; valve means for said discharge opening including a cage encircling said discharge opening, a valve slidably disposed in said cage and having a valve stem depending therefrom and terminating in a spider, and a float assembly mounted on said spider, said independent valve means being adapted to close said discharge opening at a higher level of said heavier component than that at which the drain opening valve functions; a float guard closely surrounding said spider and constituting a guide for said float assembly; and a plurality of vanes extending radially from said float guard to the wall of said chamber, both said float guard and said vanes having portions of their lower edges close to but spaced above floor level.

ALBERT J. GRANBERG.